(12) United States Patent
Moore, Jr.

(10) Patent No.: US 7,194,979 B2
(45) Date of Patent: Mar. 27, 2007

(54) METHOD AND DEVICE FOR SCRUBBING AMMONIA FROM AIR EXHAUSTED FROM ANIMAL REARING FACILITIES

(75) Inventor: Philip A. Moore, Jr., Fayetteville, AR (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 11/003,540

(22) Filed: Dec. 3, 2004

(65) Prior Publication Data

US 2006/0118058 A1   Jun. 8, 2006

(51) Int. Cl.
*A01K 1/00* (2006.01)
(52) U.S. Cl. ..................................................... 119/448
(58) Field of Classification Search ................ 119/448, 119/450, 442, 436
See application file for complete search history.

(56) References Cited

U.S. PATENT DOCUMENTS

| | | | |
|---|---|---|---|
| 3,966,450 A | 6/1976 | O'Neill et al. | |
| 5,017,203 A | 5/1991 | Cox et al. | |
| 5,666,905 A | 9/1997 | Mackin et al. | |
| 5,865,143 A | 2/1999 | Moore, Jr. | |
| 5,890,454 A | 4/1999 | Moore, Jr. | |
| 5,961,968 A | 10/1999 | Moore, Jr. | |
| 6,346,240 B1 | 2/2002 | Moore, Jr. | |
| 6,358,729 B1 | 3/2002 | Ferranti | |

FOREIGN PATENT DOCUMENTS

| | | | |
|---|---|---|---|
| DE | 4233478 A1 | * | 4/1994 |
| WO | WO 93/06063 | * | 4/1993 |

* cited by examiner

*Primary Examiner*—Thomas Price
(74) *Attorney, Agent, or Firm*—John D. Fado; Randall E. Deck; Lesley Shaw

(57) ABSTRACT

Ammonia in the air exhausted from animal containment facilities may be removed by scrubbing the air with a solution of a suitable salt of an acidic proton donor such as alum. Ammonia may be removed from the air within any enclosed animal building which includes at least one air inlet and at least one outlet, a ventilation system having an air mover effective to draw fresh air into the building through the inlet and exhaust contaminated air through the outlet, and an air scrubber in communication with the outlet. Prior to exhausting the air into the environment, the air is passed through the scrubber where it is contacted with a solution of the salt of an acidic proton donor effective for flocculating ammonia therein. The flocculated ammonia may then be removed from the solution, which may then be recycled to the scrubber.

26 Claims, 2 Drawing Sheets

METHOD AND DEVICE FOR SCRUBBING AMMONIA FROM AIR EXHAUSTED FROM ANIMAL REARING FACILITIES

BACKGROUND OF THE INVENTION

1. Field of the Invention

The Invention is drawn to a method and apparatus for removing ammonia from the air which is exhausted from animal rearing facilities such as those used for poultry and swine.

2. Description of the Prior Art

One of the major problems encountered in raising livestock such as hogs, chickens, turkeys or laying hens under confined conditions is ammonia volatilization, the production of excessive levels of ammonia gas ($NH_3$). For example, in poultry houses, as volatilization occurs, ammonia levels can reach as high as 100–200 ppm. Scarborough (Delaware Agric. Exp. Stn. Prog. Rep., NE8, 1957) and Valentine (Br. Poultry Sci. 5:149–159, 1964) both observed ammonia levels in the 60 to 70 ppm range in the atmosphere of poultry houses. Ammonia levels reaching as high as 100 ppm in commercial poultry houses have also been reported (Anderson et al., Poult. Sci. 43:305–318 (1964)).

Ammonia generation and its associated odor present not only a source of complaints from communities which neighbor animal production facilities, but exposure to excessive ammonia levels also presents serious health problems for both the animals and their human handlers, and atmospheric ammonia contributes to environmental problems. Anderson et al. demonstrated that when chickens, turkeys, guinea pigs, or mice were exposed continuously to 20 ppm ammonia, gross or histopathological signs of damage to the respiratory tract occurred after six weeks (Avian Dis. 8:369–379, 1964). They also found that chicks exposed to 20 ppm ammonia for 72 hours were much more susceptible to Newcastle Disease than controls reared in ammonia-free environments. Although all of the chickens had been exposed to the Newcastle Disease virus, only 40% of the chickens in the ammonia-free environment were infected, whereas 100% of the chicks were infected when exposed to ammonia. They indicated that these results may have been due to damage to the mucous lining of the respiratory tract. High levels of ammonia have also been shown to enhance the multiplication of *Mycoplasma gallisepticum* in the respiratory tract of chickens (Sato et al., Natl. Inst. Anim. Hlth. Qt., Tokyo, 13:45–53, 1973). Charles et al. (British Poultry Science 7:177–187, 1966) found that keratoconjunctivitis developed in hens exposed to 100 ppm ammonia after six weeks, and egg production was depressed.

Similar effects have been observed in swine. High atmospheric ammonia levels in swine rearing facilities have been shown to have a significant negative effect on feed consumption, feed conversion and daily weight gain in pigs. Strombaugh et al. found that high levels of ammonia adversely affected feed consumption and weight gain in pigs (J. Anim. Sci. 28:844, 1969). High levels of atmospheric ammonia in swine rearing facilities have been shown to aggravate swine respiratory problems, increasing their susceptibility to micro-organisms responsible for such respiratory problems, such as *Pasteurella multocida*. Ammonia also increases the susceptibility of four week old pigs to conchal atrophy. Likewise, high ammonia levels in swine facilities may play a significant role in the development of atrophic rhinitis.

In Europe, COSHH (Control of Substances Hazardous to Health) has set the limit of human exposure to ammonia at 25 ppm for an eight hour day and 35 ppm for a 10 minute exposure (Williams, Proc. Ark. Nutrition Conference, Fayetteville, Arkansas, pp. 14–29, 1992). With current production practices, these levels are often exceeded in broiler houses.

Another detrimental aspect of $NH_3$ volatilization is the effect on acid rain, with studies indicating that atmospheric ammonia pollution plays an important role in acid rain pollution. The reportedly dominant source of atmospheric $NH_3$ in Europe is livestock waste, with long term trends showing a 50% increase in $NH_3$ emissions in Europe from 1950 to 1980. Ammonia raises the pH of rainwater, which allows more $SO_2$ to dissolve in it. Ammonium sulfate then forms, which oxidizes in the soil, releasing nitric and sulfuric acid. This produces two to five times the acid input to soils previously described for acid atmospheric deposition, resulting in extremely low pH values (2.8–3.5) and high levels of dissolved aluminum in non-calcareous soils. Ammonia volatilization can also contribute to eutrophication. Reports show that nitrogen deposited via wet fallout tripled in Denmark from 1955 to 1980, corresponding to increases in nitrogen losses from agricultural operations during this period. The rising levels of nitrogen in the fallout have also been linked to the $NH_3$ content in Danish streams.

Ammonia volatilization also greatly increases atmospheric N fallout, which contributes to eutrophication. Nitrogen deposited by wet fallout tripled in Denmark between 1955 to 1980 and corresponded to N losses from agriculture during the same period. Rising levels of N in the fallout have also been shown to be highly correlated to the $NO_3$ form nitrogen content in Danish streams.

Atmospheric ammonia can also result in the formation of ammonium nitrate particles in the air. These particles, which are usually less than 2 microns in size, contribute greatly to small airborne particles referred to as PM-10's (particulate matter less than 10 microns).

A number of strategies for controlling odor, and specifically reducing ammonia volatilization, from animal production facilities have been proposed. There are several litter amendments currently on the market which supposedly reduce ammonia volatilization. Among these are MLT (Multi-Purpose Litter Treatment), PLT (Poultry Litter Treatment), De-odorase, and Ammonia Hold.

Moore, disclosed a number of different processes for inhibiting $NH_3$ volatilization from poultry litter, and from manure or urine collected from animal production facilities, by treatment with alum (aluminum sulfate), aluminum chloride, or aluminum nitrate (U.S. Pat. Nos. 5,961,968; 5,865,143; 5,914,104; 5,890,454; and 6,346,240).

In addition to processes for treating litter and animal waste, still other processes have been developed for the treatment of air exhausted from animal containment buildings. Scrubbers and/or biofiltration units have been described for use in combination with the ventilation systems of these buildings, such as described by Mackin et al. (U.S. Pat. No. 5,666,905), Ferranti (U.S. Pat. No. 6,358,729), Cox et al. (U.S. Pat. No. 5,017,203), Allen (U.S. Pat. No. 6,534,306), and Firth (U.S. Pat. No. 5,738,713).

However, despite these advances, the need remains for improved facilities and methods for rearing animals under conditions which reduce the levels of volatilized ammonia in the air from animal production facilities.

SUMMARY OF THE INVENTION

I have now discovered that ammonia in the air exhausted from animal containment facilities may be removed by scrubbing the air with a solution of a suitable salt of an acidic proton donor such as alum. Ammonia may be removed from the air within any enclosed animal building which includes at least one air inlet and at least one outlet, a ventilation system having an air mover effective to draw fresh air into the housing through the inlet and exhaust contaminated air through the outlet, and an air scrubber in communication with the outlet. Prior to exhausting the air into the environment, the air is passed through the scrubber where it is contacted with a solution of the salt of an acidic proton donor effective for flocculating ammonia therein. The flocculated ammonia may then be removed from the solution, which may then be recycled to the scrubber.

In accordance with this discovery, it is an object of this invention to provide an improved method and apparatus for reducing the level of ammonia in the air expelled from animal containment facilities.

Another object of this invention is to provide an improved method and apparatus for removing ammonia, pathogens, dust, and other particulates from the air exhausted from animal containment facilities.

Yet another object of this invention is to provide an improved method and apparatus for reducing the level of ammonia in the air expelled from animal containment facilities which is inexpensive and which is easy to operate and maintain.

Other objects and advantages of this invention will become readily apparent from the ensuing description.

DETAILED DESCRIPTION OF THE INVENTION

Figure 1:
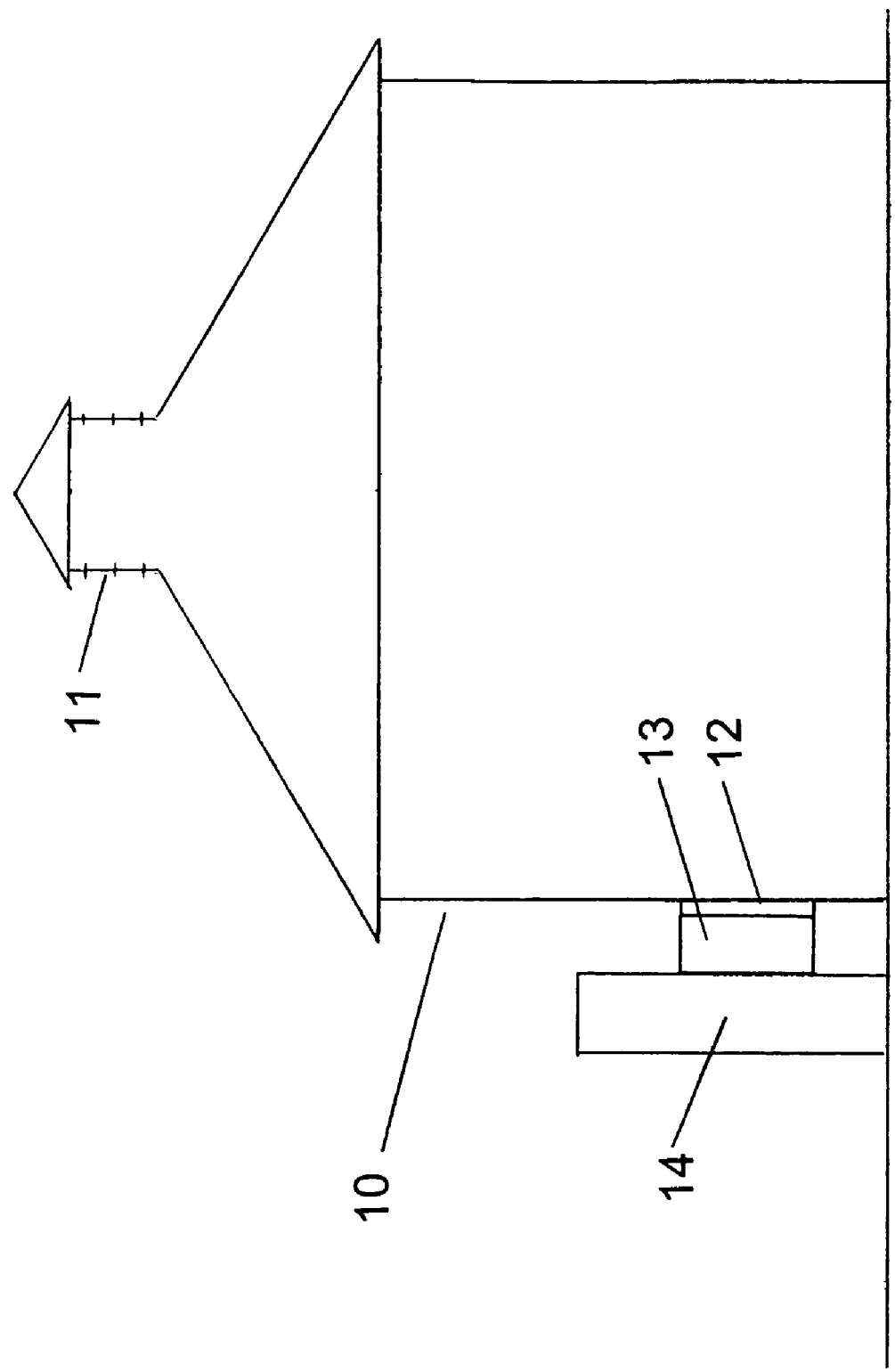
FIG. 1 is a side view of an animal containment facility equipped with a scrubber in accordance with the invention.
Figure 2:
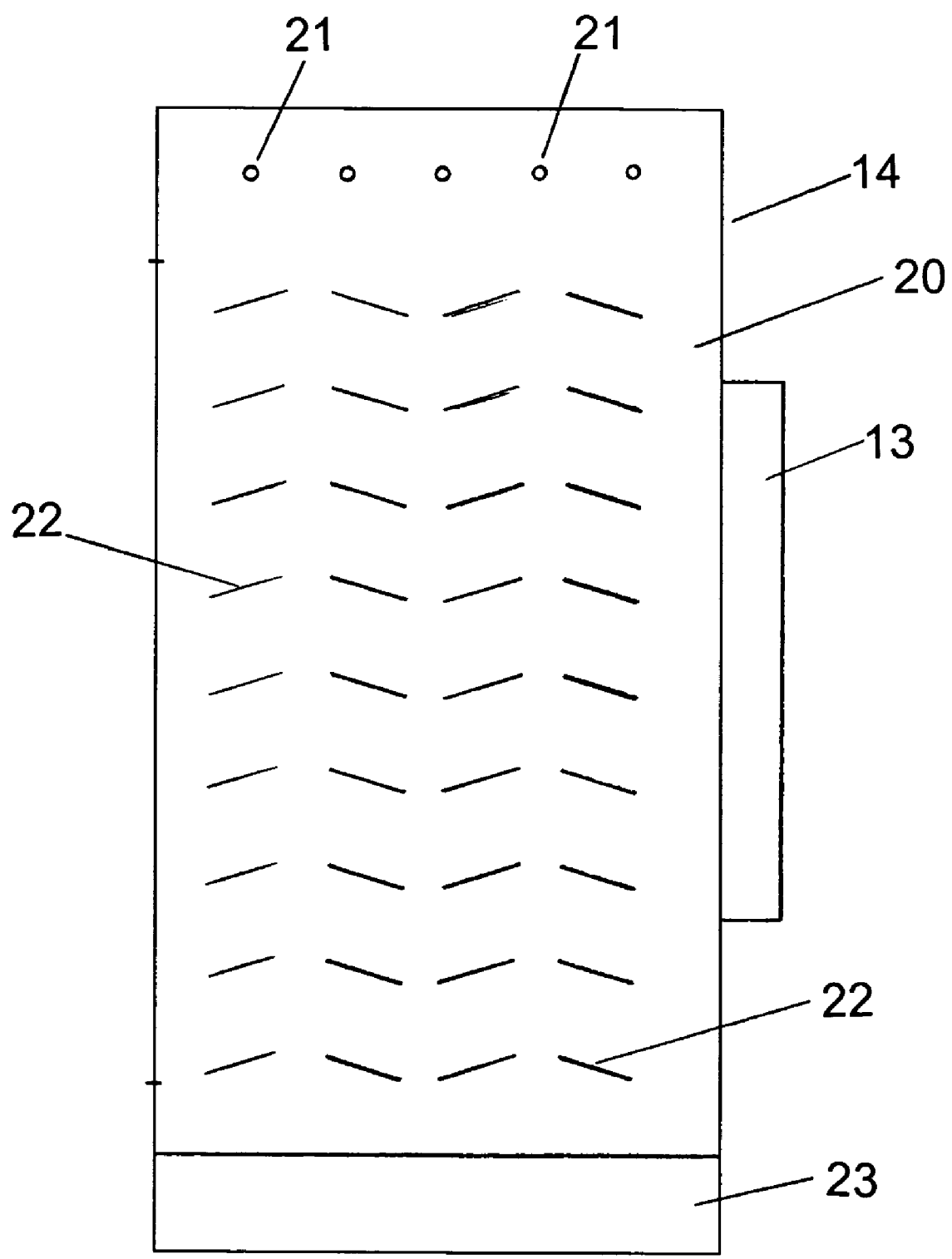
FIG. 2 is a cross-sectional view of a preferred scrubber of the invention.

The method and apparatus of this invention may be used for the treatment of air exhausted from any enclosed containment facility used for permanently or temporarily holding animals, such as for shelter, rearing, feeding, and veterinary care or other treatment. The method and apparatus may be used for the treatment of air exhausted from containment facilities for a variety of livestock, and domestic or wild animals, including but not limited to, swine, poultry, bovine, equine, caprine, and ovine. However, the method and apparatus are particularly suited for the removal of ammonia from the air exhausted from containment facilities used for large-scale production of poultry and swine, most particularly broiler chickens, breeder chickens, laying hens, turkeys, ducks, hogs, dairy cows, and beef cattle.

In accordance with this invention, as air is circulated through an animal containment facility it is exhausted through an outlet which has a scrubber positioned in communication therewith. In the scrubber, the air is contacted with a solution of a salt of an acidic proton donor which is effective for flocculating ammonia present in the air stream. As the air passes through the solution, the salt of the proton donor will flocculate ammonia in the air, which flocculated ammonia may then be readily separated from the solution for disposal. Moreover, in addition to flocculating ammonia, scrubbing the air with the solution provides the added benefit of removing other odors, dust, and particulates, including microbial pathogens such as *Histoplasma capsulatum*, therefrom. The treated air from which ammonia has been removed may be exhausted to the environment, while the aqueous solution containing the flocculated ammonia may be discarded or preferably collected and recycled. Moreover, although the aqueous stream may be discarded or recycled without further treatment, in a particularly preferred embodiment it is first treated to remove flocculated ammonia therefrom using conventional solid/liquid separation techniques. Without being limited thereto, flocculated ammonia may be removed from the aqueous solution, for example, by filtration, centrifugation, settling, precipitation, or any combination thereof.

The structure of the animal containment facility is not critical, and the process can be practiced in any conventional building (10) for holding livestock or other animals such as shown in FIG. 1, having a roof, enclosed walls, at least one inlet (11) for admitting air from the environment, at least one outlet (12) for exhausting air therefrom, and a ventilation system (13) having one or more air movers such as fans positioned adjacent to an inlet (11), outlet (12) or both, which are effective to draw air into the building (10) through the inlet(s) and out from the outlet(s). To provide for contact between the aqueous scrubbing solution and the air from the building, one or more air scrubbers (14) are provided in communication with each outlet (12) where air is discharged from the building.

The construction of the scrubber (14) is not critical, and a variety of conventional vapor-liquid contact devices are suitable for use herein, including known scrubber, vapor-liquid absorption column, and mechanical-draft evaporative cooling tower designs. Without being limited thereto, examples of scrubber designs which are suitable for use herein are described in The Chemical Engineers' Handbook [fifth edition, Perry and Chilton (ed.), McGraw-Hill, New York, 1973, see pp. 18–90, 20–94 through 20–103] and vapor-liquid contactors described by Henley and Seader (Equilibrium-Stage Separation Operations in Chemical Engineering, John Wiley & Sons, New York, 1981, see pp. 47–76), the contents of each of which are incorporated by reference herein.

In accordance with a preferred embodiment shown in FIG. 2, the scrubber (14) is an adaptation of a forced-draft evaporative cooling tower wherein air from building (10) is blown generally horizontally through a scrubber housing (20) positioned adjacent to fan (13) and outlet (12), while the scrubbing solution is dispensed in a crosscurrent flow from a plurality of conduits (21) positioned at the top of the housing (20). Conduits (21) are adapted to dispense a large volume of the scrubbing solution at a rate sufficient to provide a continuous, unbroken stream of liquid or a waterfall thereof. A plurality of angled contact baffles or plates (22) are also positioned within the housing to promote turbulence and provide a tortuous air flow path through the scrubbing solution. A trough (23) may be provided at the bottom of the housing for collecting scrubbing solution, which may be recirculated to conduits (21) or other equipment for separation of flocculated ammonia therefrom. Although the scrubber housing (20) and baffles (22) may be constructed from a variety of conventional materials such as ceramics, metals or plastics, due to the corrosive properties of the scrubbing solution they are preferably constructed from wood.

Suitable salts of acidic proton donors for use in the invention are those which are effective as flocculents for ammonia. Preferred salts of acidic proton donors include but are not limited to alum (aluminum sulfate, $Al_2(SO_4)_3$), $AlCl_3$, $Al(NO_3)_3$, $Na_2SO_4$, $NaHSO_4$, $FeSO_4$, $Fe_2(SO_4)_3$, $FeCl_2$, $FeCl_3$, $Fe(NO_3)_2$, $Fe(NO_3)_3$, $CaSO_4$, $CaCl_2$, $Ca(NO_3)_2$, $MgCl_2$, $MgSO_4$, $Mg(NO_3)_2$, and combinations thereof, with alum being particularly preferred. The solutions of the above-mentioned salts may be prepared from the compounds in any of their anhydrous or various, known hydrated forms, or from concentrated or stock solutions thereof.

The scrubbing solution containing the salt of an acidic proton donor will be prepared by formulating the compound in a suitable inert, liquid phase solvent as known in the art. While a variety of solvents may be used, as a practical matter the preferred solvent is water. The pH of the solution is not critical, but will typically vary between about 2 to about 6.

The salt of an acidic proton donor of the invention generally acts to reduce the concentration of ammonia in the air exiting an animal containment facility by binding and flocculating ammonia which is present in air. Accordingly, this salt of the proton donor is administered in an amount effective to flocculate ammonia in air as determined by routine testing. An "effective amount" is defined herein as that amount which will result in a significant reduction of ammonia in a test air stream as compared to an untreated control (measured at a confidence level of at least 80%, preferably measured at a confidence level of 90%). Without being limited thereto, in a preferred embodiment, the salt of the proton donor is provided in an amount sufficient to reduce the ammonia concentration in the air exiting the scrubber to less than about 25 ppm, most preferably to less than about 10 ppm. Suitable amounts of the salts of the proton donor may be readily determined by a practitioner skilled in the art, and will vary with the particular compound selected and the ammonia concentration in the air within the animal containment facility. By way of example and without being limited thereto, in a preferred embodiment the concentration of the salt of the proton donor in the aqueous solution is between about 0.001% and about 50%, more preferably between about 1% and about 50%, by weight.

Besides the salt of the acidic proton donor, other additives and adjuncts may be formulated into the composition. Suitable additives may include, but are not limited to, polymers, fungicides, fungistats, bactericides, bacteriostats, or combinations thereof, with addition of polymers to assist flocculation being preferred. A variety of polymers are suitable for enhancing flocculation of ammonia, and include naturally occurring polymers, synthetic polymers such as polyacrylamide, and it is envisioned that cationic polyelectrolytes (such as proteins or gum arabic, polyethyleneimine, or polyacrylic acid salts) would also be suitable.

It is understood that the foregoing detailed description is given merely by way of illustration and that modifications and deviations may be made therein without departing from the spirit and scope of the invention.

I claim:

1. A method for removing ammonia, other odors, dust, particulates, and microbial pathogens from the air from an animal rearing facility comprising:
    a) providing an enclosed building for an animal, said building comprising at least one inlet for admitting air from the environment, at least one outlet for exhausting air therefrom, a ventilation system comprising an air mover effective to draw air into said building through said inlet and out from said outlet, and an air scrubber in communication with said outlet;
    b) moving air in said building through said outlet and said scrubber; and
    c) contacting said air moving through said scrubber with an solution of a salt of an acidic proton donor selected from the group consisting of alum, $AlCl_3$, $Al(NO_3)_3$, $Na_2SO_4$, $NaHSO_4$, $FeSO_4$, $Fe_2(SO_4)_3$, $FeCl_2$, $FeCl_3$, $Fe(NO_3)_2$, $Fe(NO_3)_3$, $CaSO_4$, $CaCl_2$, $Ca(NO_3)_2$, $MgCl_2$, $MgSO_4$, $Mg(NO_3)_2$, and combinations thereof, said solution being provided in an amount effective for removing ammonia present in said air by flocculation of said ammonia with said salt of an acidic proton donor.

2. The method of claim 1 further comprising removing flocculated ammonia from said solution following said contacting.

3. The method of claim 2 wherein said flocculated ammonia is removed by filtration, centrifugation, settling, precipitation, or a combination thereof.

4. The method of claim 1 further comprising recycling said solution to said scrubber following said contacting.

5. The method of claim 4 further comprising removing flocculated ammonia from said solution following said contacting and prior to said recycling.

6. The method of claim 5 wherein said flocculated ammonia is removed by filtration, centrifugation, settling, precipitation, or a combination thereof.

7. The method of claim 6 wherein said flocculated ammonia is removed by filtration.

8. The method of claim 1 wherein said animals are selected from the group consisting of swine, poultry, bovine, equine, caprine, and ovine.

9. The method of claim 8 wherein said animals are selected from the group consisting of swine and poultry.

10. The method of claim 9 wherein said animals comprise poultry.

11. The method of claim 1 wherein said salt of an acidic proton donor comprises alum.

12. The method of claim 1 wherein said scrubber is positioned adjacent to said outlet.

13. The method of claim 1 wherein said solution is provided in an amount effective to reduce the ammonia concentration in the air exiting said scrubber to less than about 25 ppm.

14. The method of claim 13 wherein said solution is provided in an amount effective to reduce the ammonia concentration in the air exiting said scrubber to less than about 10 ppm.

15. The method of claim 1 wherein the concentration of said salt of an acidic proton donor in said solution is between about 0.001% and about 50%, by weight.

16. The method of claim 1 wherein said solution is an aqueous solution.

17. The method of claim 1 wherein said contacting comprises moving said air through a continuous stream of said solution in said scrubber.

18. The method of claim 1 wherein said solution further comprises a polymer, fungicide, fungistat, bactericide, bacteriostat, or combinations thereof.

19. The method of claim 18 wherein said polymer is selected from the group of naturally occurring polymers and synthetic polymers.

20. The method of claim 19 wherein said polymer is selected from the group consisting of polyacrylamide, a cationic polyelectrolyte, and mixtures thereof.

21. A method for removing ammonia from the air from an animal rearing facility comprising:
    a) providing an enclosed building for an animal, said building comprising at least one inlet for admitting air from the environment, at least one outlet for exhausting air therefrom, a ventilation system comprising an air mover effective to draw air into said building through said inlet and out from said outlet, and an air scrubber in communication with said outlet;

b) moving air in said building through said outlet and said scrubber;

c) contacting said air moving through said scrubber with a solution of a salt of an acidic proton donor selected from the group consisting of alum, $AlCl_3$, $Al(NO_3)_3$, $Na_2SO_4$, $NaHSO_4$, $FeSO_4$, $Fe_2(SO_4)_3$, $FeCl_2$, $FeCl_3$, $Fe(NO_3)_2$, $Fe(NO_3)_3$, $CaSO_4$, $CaCl_2$, $Ca(NO_3)_2$, $MgCl_2$, $MgSO_4$, $Mg(NO_3)_2$, and combinations thereof, said solution being provided in an amount effective for removing ammonia present in said air by flocculation of said ammonia with said salt of an acidic proton donor; and d) removing flocculated ammonia from said solution following said contacting.

22. The method of claim 21 wherein said flocculated ammonia is removed by filtration, centrifugation, settling, precipitation, or a combination thereof.

23. The method of claim 21 further comprising recycling said solution to said scrubber following said removing.

24. The method of claim 12 wherein said solution is an aqueous solution.

25. A method for removing ammonia from the air from an animal rearing facility comprising:

a) providing an enclosed building for an animal, said building comprising at least one inlet for admitting air from the environment, at least one outlet for exhausting air therefrom, a ventilation system comprising an air mover effective to draw air into said building through said inlet and out from said outlet, and an air scrubber in communication with said outlet;

b) moving air in said building through said outlet and said scrubber; and c) contacting said air moving through said scrubber with a solution of a salt of an acidic proton donor selected from the group consisting of alum, $AlCl_3$, $Al(NO_3)_3$, $Na_2SO_4$, $NaHSO_4$, $FeSO_4$, $Fe_2(SO_4)_3$, $FeCl_2$, $FeCl_3$, $Fe(NO_3)_2$, $Fe(NO_3)_3$, $CaSO_4$, $CaCl_2$, $Ca(NO_3)_2$, $MgCl_2$, $MgSO_4$, $Mg(NO_3)_2$, and combinations thereof, said solution being provided in an amount effective for removing ammonia present in said air by flocculation of said ammonia with said salt of an acidic proton donor, and wherein said solution further comprises a polymer selected from the group consisting of naturally occurring polymers and synthetic polymers.

26. The method of claim 25 wherein said polymer is selected from the group consisting of polyacrylamide, a cationic polyelectrolyte, and mixtures thereof.

* * * * *